(12) United States Patent
Talja

(10) Patent No.: US 7,944,087 B2
(45) Date of Patent: May 17, 2011

(54) METHOD AND APPARATUS FOR STABILIZING VOLTAGE OF INTERMEDIATE CIRCUIT OF FREQUENCY CONVERTER

(75) Inventor: Markku Talja, Järvenpää (FI)

(73) Assignee: ABB OY, Helsinki (FI)

( * ) Notice: Subject to any disclaimer, the term of this patent is extended or adjusted under 35 U.S.C. 154(b) by 452 days.

(21) Appl. No.: 12/193,247

(22) Filed: Aug. 18, 2008

(65) Prior Publication Data

US 2009/0052217 A1    Feb. 26, 2009

(30) Foreign Application Priority Data

Aug. 24, 2007    (FI) ..................................... 20075587

(51) Int. Cl.
   *H02J 5/00*    (2006.01)
(52) U.S. Cl. ............. 307/33; 318/702; 320/108; 363/17
(58) Field of Classification Search .................. 307/33, 307/66, 71, 82, 102, 104, 150; 363/17, 37, 363/39, 44, 47, 89, 97, 98; 318/702, 448, 318/376, 299; 320/108, 109, 139, 140, 155; 336/174, 176, 181, 165
See application file for complete search history.

(56) References Cited

U.S. PATENT DOCUMENTS

| 4,811,189 | A | | 3/1989 | Harvest et al. | |
|---|---|---|---|---|---|
| 5,341,083 | A | * | 8/1994 | Klontz et al. | 320/109 |
| 5,793,624 | A | * | 8/1998 | Couture et al. | 363/89 |
| 6,462,432 | B1 | * | 10/2002 | Seelig et al. | 307/33 |
| 6,462,973 | B2 | * | 10/2002 | Moindron | 363/127 |
| 6,590,302 | B2 | * | 7/2003 | Goepfrich et al. | 307/102 |
| 6,970,366 | B2 | * | 11/2005 | Apeland et al. | 363/132 |

FOREIGN PATENT DOCUMENTS

| FI | 1115575 B | 5/2005 |
|---|---|---|
| FI | 1116336 B | 10/2005 |
| FI | 20055052 A | 8/2006 |

OTHER PUBLICATIONS

Finnish Office Action.

* cited by examiner

*Primary Examiner* — Rajnikant B Patel
(74) *Attorney, Agent, or Firm* — Buchanan Ingersoll & Rooney PC

(57) ABSTRACT

A method and an apparatus for damping voltage oscillation of a voltage intermediate circuit of a frequency converter, the frequency converter comprising a half controlled rectifier bridge coupled to a supply network. The method comprises determining magnitude ($U_c$) of voltage of the voltage intermediate circuit, determining magnitude ($U_{in}$) of rectified voltage of the supply network, forming a derivative of a difference ($U_{in}-U_c$) between the rectified voltage of the supply network and the voltage of the voltage intermediate circuit, delaying firing of controllable components of the rectifier bridge on the basis of the formed derivative.

4 Claims, 1 Drawing Sheet

METHOD AND APPARATUS FOR STABILIZING VOLTAGE OF INTERMEDIATE CIRCUIT OF FREQUENCY CONVERTER

BACKGROUND OF THE INVENTION

The invention relates to frequency converters, and particularly to stabilizing voltage of an intermediate circuit of frequency converters.

A frequency converter is a device which is typically used for controlling motors at a varying supply frequency, enabling the speed of the motor being controlled to be controlled. Such frequency converters comprise a rectifier bridge, a direct voltage intermediate circuit, and an inverter. The rectifier bridge rectifies the voltage of a supply network and supplies with a rectified voltage the direct voltage intermediate circuit. From this voltage of the direct voltage intermediate circuit, the inverter, in turn, forms a voltage which has controllable frequency and amplitude and which is to be supplied to a load.

A direct voltage intermediate circuit, i.e. a DC intermediate circuit, of a frequency converter comprises one or more capacitors provided for serving as energy storages and for evening out direct voltage of the intermediate circuit. The intermediate circuit also includes inductance, either as an actual intermediate circuit DC choke or as an AC choke, which may be reduced to the DC side.

When charging the intermediate circuit, the charging current is to be limited in one way or another. Otherwise, a large current charging the capacitance of the intermediate circuit causes an overcurrent release. The voltage of the intermediate circuit may be raised to a voltage value corresponding with the operational state e.g. by a half controlled rectifier bridge. In such a half controlled bridge, second branches of each input phase are provided with controllable semiconductors, most typically thyristors. By decreasing the flow angle of the thyristors, the voltage of the intermediate circuit may be made to increase in a controlled manner by using a charging current of a magnitude within allowable limits. During normal use these thyristors are constantly controlled to be open such that the operation of the rectifier resembles that of a diode bridge.

A transfer function of an LC circuit formed by the inductance and capacitance of the intermediate circuit is a quadratic equation having gain dependent on losses at the resonance frequency of the LC circuit. An inverter of a frequency converter may be thought to present a constant power load to the voltage intermediate circuit, i.e. when a voltage $U_c$ of the voltage intermediate circuit increases, current taken from the intermediate circuit decreases. Such a circuit involves a danger of intermediate circuit voltage oscillation.

Intermediate circuit voltage oscillation at supply frequency causes on the supply side a direct current component, which saturates a supply transformer, which, in turn, further increases the intermediate circuit oscillation.

The voltage oscillation occurs particularly in connection with high-power frequency converters at a large load and only in certain conditions. The frequency of such problematic voltage oscillation is of the magnitude of the frequency of the supply network or close to it. Such voltage oscillation stresses the DC capacitors of the intermediate circuit, for example.

BRIEF DESCRIPTION OF THE INVENTION

An object of the invention is thus to provide a method and an apparatus implementing the method so as to enable the aforementioned problem to be alleviated. The object of the invention is achieved by a method and a system which are characterized by what is stated in the independent claims. Preferred embodiments of the invention are disclosed in the dependent claims.

The invention is based on the idea that a half controlled thyristor bridge is controlled on the basis of the voltage of an intermediate circuit in a manner stabilizing the voltage. Particularly, the thyristor bridge is controlled such that when the voltage increases due to the influence of oscillation, the firing angle of a thyristor to be fired next is delayed.

An advantage of the method and system according to the invention is that the oscillation problem is alleviated significantly. Furthermore, the invention may be implemented by using a simple apparatus, and applying the invention does not impair the performance of the frequency converter.

BRIEF DESCRIPTION OF THE FIGURES

The invention is now described in closer detail in connection with preferred embodiments and with reference to the accompanying drawings, in which.

DETAILED DESCRIPTION OF THE INVENTION

Figure 1:
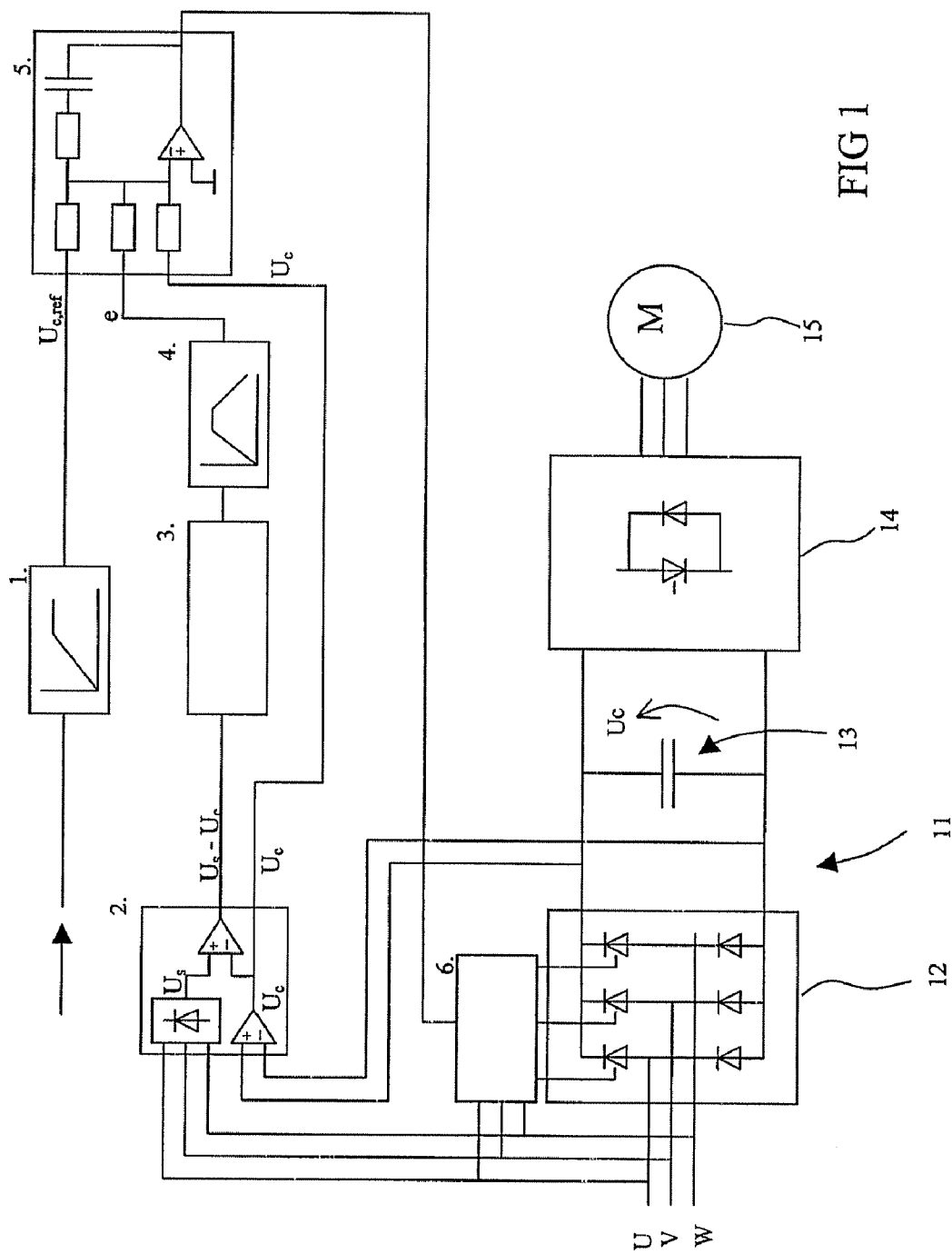
FIG. 1 shows a block diagram implementing a method according to the invention.

FIG. 1 schematically shows a frequency converter 11, and a block diagram implementing a method according to the invention. The FIGURE shows main circuit parts of the frequency converter, i.e. a rectifier bridge 12, a DC voltage intermediate circuit 13, and an inverter 14. The rectifier bridge is formed as a half controlled rectifier, i.e. the upper branches of each phase are formed from controllable components which, in the solution shown in FIG. 1, are thyristors. The frequency converter 11 is connected to a supply network U, V, W and to a controllable motor 15.

FIG. 1 further shows a gate driver 6 for controlling the thyristors of the rectifier bridge. The FIGURE shows the gate driver being coupled to the supply network. Through this coupling the gate driver synchronizes with the network and, on the basis of phase voltages of the supply voltage, concludes which thyristor is to be controlled at a given time.

Prior to using the frequency converter, the intermediate circuit of the frequency converter is to be charged in a manner known per se. In the circuit shown in FIG. 1, charging is carried out such that a voltage instruction block 1 receives a starting instruction. In response to this instruction $U_{c,ref}$ the block 1 starts to increase a voltage instruction steadily towards a desired intermediate circuit voltage $U_c$. This instruction is routed through a control circuit 5 to the gate driver 6. The gate driver controls the firing angles of the thyristors in a manner known per se such that the voltage in the intermediate circuit increases in a controlled manner at a current allowed for charging.

According to the method of the invention, the magnitude of voltage $U_c$ of the voltage intermediate circuit as well as the magnitude of voltage of the supplying network are determined. The magnitude of the voltage $U_c$ of the voltage intermediate circuit is also determined in a manner known per se for monitoring the charging and possibly for other control of the frequency converter. The magnitude of the voltage of the intermediate circuit is typically determined directly by measuring a difference of potential between the positive and negative rails of the intermediate circuit.

The magnitude of the voltage of the supply network is determined according to a preferred embodiment of the invention by using a diode rectifier bridge, shown in the FIGURE in a block 2. In a manner known per se, a diode bridge forms a pulsating direct voltage from a three-phase supply voltage. In the block 2, a difference $U_s - U_c$ between the rectified supplying voltage $U_s$ and the intermediate circuit voltage $U_c$ further formed.

The aforementioned difference between the voltages describes an error in the voltage of the intermediate circuit, since the magnitude of the voltage of the intermediate circuit is to correspond with the magnitude of the rectified supply voltage when the thyristors of the half controlled rectifier bridge 12 are controlled so as to form a full voltage to the intermediate circuit. An error in the voltage of the intermediate circuit thus also enables the problematic voltage oscillation in the intermediate circuit to be noticed.

The formed difference is communicated to a derivation block 3, which forms a time derivative of a difference between the rectified supplying voltage and voltage of the intermediate circuit. An output of this derivation block 3 is given a value of zero if the difference at an input remains constant. When the difference becomes smaller, i.e. when the voltage of the intermediate circuit increases in relation to the supplying voltage, a negative signal proportional to the rate of change of the input is formed at the output of the derivation block. Correspondingly, when the difference increases, the output is given positive values whose magnitude is proportional to the rate of change.

The output of the derivation block 3 is connected to a filter block 4, which low-pass-filters the formed derivative. Changes that are not associated with LC circuit oscillation, such as distortion components from the supply, are removed from the derivative formed by low-pass filtering.

The output of the filter block 4 forms a stabilizing feedback signal e, which is supplied to a control block 5. The control block 5 receives three inputs, the voltage instruction $U_{c,ref}$ from the block 1, said stabilizing feedback signal e, and a measuring signal on the voltage $U_c$ of the voltage intermediate circuit, which in FIG. 1 is produced by the block 2. The control block 5 of FIG. 1 is formed as a summing operational amplifier circuit, which forms a PI controller. Each of the aforementioned inputs is routed via a resistance to an inverting input of the operational amplifier while the output of the operational amplifier is coupled via a resistance and a capacitor back to the inverting input. The resistance of the feedback of the operational amplifier circuit and the capacitor determine a time constant of integration of the controller.

The operational amplifier circuit is a summing one, i.e. the potential of the output of the circuit increases, determined by the time constant, so as to equal the sum of the potentials of the inputs. The magnitudes of the resistances of each input may be used for influencing the magnitude of the total voltage at the output. In an operation situation wherein the voltage instruction $U_{c,ref}$ corresponds with the measured voltage $U_c$ and the derivative to be calculated by the block 3 is zero, the output of the control circuit may be scaled by said resistances to correspond with a signal indicating full voltage to be given to the gate driver.

In situations where changes occur the operation is as follows. When the measured voltage $U_c$ of the intermediate circuit increases in relation to the rectified voltage $U_s$ of the network, the output of the derivation block 3 is given a negative value since $d(U_s - U_c)/dt$ is negative. From this derivative, the most abrupt changes are filtered by a low-pass filter, and further, a negative stabilizing feedback signal e is supplied to the control circuit 5. Simultaneously the measured voltage $U_c$ of the intermediate circuit is brought to the control circuit 5. The output of the control circuit decreases due to the influence of the signal e and thus delays the firing of the thyristor being controlled, i.e. increases the control angle of the thyristor. The measured voltage $U_c$ of the intermediate circuit in turn, corrects a steady state error between the measurement and the instruction by contributing to simultaneously increasing the output of the control 5, since said derivation provides correction only when the difference between the measured intermediate circuit voltage and the supplying voltage changes. Restricting an increase in the voltage prevents oscillation from occurring or at least decreases the oscillation significantly.

It is apparent to one skilled in the art that the basic idea of the invention may be implemented in many different ways. The invention and its embodiments are thus not restricted to the above-described examples but may vary within the scope of the claims.

The invention claimed is:

1. A method of damping voltage oscillation of a voltage intermediate circuit of a frequency converter, the frequency converter comprising a half controlled rectifier bridge coupled to a supply network, the method comprising
    determining magnitude ($U_c$) of voltage of the voltage intermediate circuit,
    determining magnitude ($U_{in}$) of rectified voltage of the supply network,
    forming a derivative of a difference ($U_{in} - U_c$) between the rectified voltage of the supply network and the voltage of the voltage intermediate circuit,
    delaying firing of controllable components of the rectifier bridge on the basis of the formed derivative.

2. A method as claimed in claim 1, the method further comprising
    low-pass filtering the formed derivative,
    bringing to a control circuit as inputs the low-pass-filtered derivative, the determined magnitude ($U_c$) of the voltage of the voltage intermediate circuit, as well as a reference value ($U_{c,ref}$) for the voltage of the voltage intermediate circuit, and
    forming, in the control circuit, a control signal for a gate driver (6) on the basis of the inputs by summing signals of the inputs by an integrator of the control circuit.

3. A method as claimed in claim 1, the method further comprising, when the voltage of the voltage intermediate circuit increases, increasing a control angle of the controllable components on the basis of the derivative.

4. An apparatus for damping voltage oscillation of a voltage intermediate circuit of a frequency converter, the frequency converter comprising a half controlled rectifier bridge coupled to a supply network, the apparatus comprises
    means for determining magnitude ($U_c$) of voltage of the voltage intermediate circuit,
    means for determining magnitude ($U_{in}$) of rectified voltage of the supply network,
    derivation means for forming a derivative of a difference ($U_{in} - U_c$) between the rectified voltage of the supply network and the voltage of the voltage intermediate circuit, and
    means for delaying firing of controllable components of the rectifier bridge on the basis of the formed derivative.

* * * * *